US012248769B2

(12) United States Patent
Kaga et al.

(10) Patent No.: US 12,248,769 B2
(45) Date of Patent: Mar. 11, 2025

(54) PROGRAM ANALYZING APPARATUS, PROGRAM ANALYZING METHOD, AND TRACE PROCESSING ADDITION APPARATUS

(71) Applicant: HITACHI, LTD., Tokyo (JP)

(72) Inventors: Hiroto Kaga, Tokyo (JP); Masumi Kawakami, Tokyo (JP); Yasufumi Suzuki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 49 days.

(21) Appl. No.: 18/547,873

(22) PCT Filed: Feb. 15, 2022

(86) PCT No.: PCT/JP2022/005804
§ 371 (c)(1),
(2) Date: Aug. 24, 2023

(87) PCT Pub. No.: WO2022/196219
PCT Pub. Date: Sep. 22, 2022

(65) Prior Publication Data
US 2024/0143300 A1 May 2, 2024

(30) Foreign Application Priority Data
Mar. 18, 2021 (JP) .................................. 2021-044926

(51) Int. Cl.
*G06F 8/41* (2018.01)
(52) U.S. Cl.
CPC .................................. *G06F 8/4435* (2013.01)
(58) Field of Classification Search
None
See application file for complete search history.

(56) References Cited

U.S. PATENT DOCUMENTS

| 5,414,853 | A  | * | 5/1995  | Fertig  | G06F 11/3604 |
|           |    |   |         |         | 714/E11.219  |
| 5,854,924 | A  | * | 12/1998 | Rickel  | G06F 11/3604 |
|           |    |   |         |         | 714/48       |
| 8,762,949 | B2 | * | 6/2014  | Conway  | G06F 8/73    |
|           |    |   |         |         | 717/126      |
| 9,378,000 | B1 | * | 6/2016  | Lee     | G06F 8/75    |
| 2018/0114026 | A1 |  | 4/2018 | Wang et al. | |
| 2023/0259447 | A1 | * | 8/2023 | Kawakami | G06F 11/3636 |
|           |    |   |         |         | 717/128      |

FOREIGN PATENT DOCUMENTS

JP 2012-128727 A 7/2012
JP 2013-149164 A 8/2013

OTHER PUBLICATIONS

International Search Report, mailed May 24, 2022, for International Application No. PCT/JP2022/005804.
Written Opinion, mailed May 24, 2022, for International Application No. PCT/JP2022/005804 (without English translation).

* cited by examiner

*Primary Examiner* — Marina Lee
(74) *Attorney, Agent, or Firm* — Baker Botts L.L.P.

(57) ABSTRACT

A program analyzing apparatus (failure analyzing apparatus) includes an execution path reduction unit that deletes an execution path that is not executed by referring to information related to a branch destination of a conditional branch included in a program, from all execution paths that are all executable execution paths among execution paths that are columns of statements to be sequentially executed in the program.

7 Claims, 9 Drawing Sheets

```
412   1   int foo(int x, int y) {
      2     if (x < y)
      3       return y;
      4     else
      5       return x;
      6   }
```

```
442   1   int foo(int x, int y) {
      2     Trace(x, y);
      3     if (x < y)
      4       return y;
      5     else
      6       return x;
      7   }
```

*FIG. 8*

411 —
```
1  int bar(int a, int b) {
2    int c;
3    c = foo(a+b, a-b);
4    return c;
5  }
```

```
FUNCTION: bar
ARGUMENT: int a; a >= 0, a <= 5
ARGUMENT: int b; b >= 0, b <= 5
RETURN VALUE: int c; c >= 1, c < 10
```
479

442 —
```
1  int foo(int x, int y) {
2    Trace(x, y);
3    if (x < y)
4      return y;
5    else
6      return x;
7  }
```

```
TRACE ID: 23
TRACE LOCATION: foo, line 2
TRACE RESULT: x = 5, y = 5
```
169

| # | FAILURE OCCURRENCE DATE AND TIME | OCCURRENCE LOCATION |
|---|---|---|
| 1 | 2020/12/25 06:30 | FUNCTION A |
| 2 | 2020/12/24 22:00 | FUNCTION B |
| 3 | 2020/12/24 15:00 | FUNCTION C |
| 4 | 2020/12/24 10:00 | FUNCTION A |
| 5 | 2020/12/24 06:00 | FUNCTION B |
| 6 | 2020/12/23 22:00 | FUNCTION D |
| 7 | 2020/12/22 15:00 | FUNCTION E |
| 8 | 2020/12/22 10:00 | FUNCTION A |

PROGRAM ANALYZING APPARATUS, PROGRAM ANALYZING METHOD, AND TRACE PROCESSING ADDITION APPARATUS

TECHNICAL FIELD

The present invention relates to a program analyzing apparatus, a program analyzing method, and a trace processing addition apparatus that support an analysis of a software program.

BACKGROUND ART

In software (program) development, it is desirable that an operation of software which is not assumed by a developer is referred to as a failure, and the failure is corrected and eliminated before releasing the software. As a general method for detecting a failure, there is a test. In the test, the developer defines expected input and output, confirms whether the software operates as expected, and determines a case where the software does not operate as expected, as a failure. When the failure occurs, the developer analyzes in which part of the software unexpected processing has been executed, specifies a cause location, and then corrects the logic of the software to execute appropriate processing.

In the case of embedded software that executes some calculation based on an input value to determine an output value, the software operates normally for most inputs, and an abnormality may occur only under extremely rare conditions. This type of failure is referred to as a non-reproduction failure because it is difficult to determine a condition under which the failure occurs.

PTL 1 discloses a method of evaluating problem propagation at the time of a problem in a software component by obtaining which output does not satisfy a specification in response to an input that violates the specification in the software component in which the input specification and the output specification are defined.

CITATION LIST

Patent Literature

PTL 1: JP 2012-128727 A

SUMMARY OF INVENTION

Technical Problem

In the method disclosed in PTL 1, it is possible to evaluate the action of the software component when an abnormal input is given, but it is not possible to analyze the cause of a failure that an abnormal output is caused in response to a normal input.

As an approach for solving the non-reproduction failure, analysis using symbol execution can be performed. Symbol execution is a technique of comprehensively extracting an order (execution path) of processing that may be executed by target software and determining an input for executing each path. By using symbol execution, it is possible to generate data to be input at the time of a test and obtain input data when a failure occurs, and it is possible to efficiently perform a test.

On the other hand, the symbol execution requires calculation resources and calculation time to comprehensively evaluate execution paths. When symbol execution is applied to complex and large-scale software, the execution path becomes enormous, so that the calculation processing time increases, and it may not be possible to complete failure analysis within a scheduled development period.

The present invention has been made in view of such a background, and an object thereof is to provide a program analyzing apparatus, a program analyzing method, and a trace processing addition apparatus capable of shortening a program analysis time for solving a failure.

Solution to Problem

In order to achieve the above object, according to the present invention, a program analyzing apparatus includes an execution path reduction unit that deletes an execution path that is not executed by referring to information related to a branch destination of a conditional branch included in a program, from all execution paths that are all executable execution paths among execution paths that are columns of statements to be sequentially executed in the program; a function specification acquisition unit that acquires specifications of ranges of an argument and a return value of a function included in the program; and a failure location detection unit that calculates a failure condition that is a value of the argument inconsistent with the specification among functions included in a remaining execution path after deletion by the execution path reduction unit.

In addition, according to the present invention, a trace processing addition apparatus includes a trace processing addition unit that insert, immediately before a statement of a conditional branch satisfying a predetermined condition included in a program, trace processing of outputting a value of a variable included in the statement of the conditional branch to an execution log with a priority given to the conditional branch. The predetermined condition is any one of a condition that the program is in a function included in a plurality of function execution paths among function execution paths that are columns of functions to be sequentially executed in the program, a condition that the program is included in a plurality of execution paths among the execution paths that are columns of statements to be sequentially executed in the program, a condition that the program is included in a function in which a failure has occurred in the past, and a condition that the program is included in an execution path on which a test has not been performed.

Advantageous Effects of Invention

According to the present invention, it is possible to provide a program analyzing apparatus, a program analyzing method, and a trace processing addition apparatus capable of shortening a program analysis time for solving a failure.

BRIEF DESCRIPTION OF DRAWINGS

FIG. 8 is a diagram for explaining failure analysis processing according to the present embodiment.

DESCRIPTION OF EMBODIMENTS

<<Outline of Failure Analysis Support System>>

Hereinafter, a failure analysis support system according to a form (embodiment) for carrying out the present invention will be described. The failure analysis support system specifies (a range of) a failure location by using a technique of symbol execution for a program (source code, software). Symbol execution is a technique of simulating execution of a program while updating a constraint condition by providing the constraint condition to a variable instead of substituting a specific value for the variable and executing the program (proceeding with processing of the program). As will be described later, by using symbol execution, it is possible to calculate a value (failure occurrence condition) of an argument inconsistent with specifications of an argument and a return value of a function, and to use the value to analyze the failure (specify a failure location).

The sequence of steps (statements) executed in the program is referred to as an execution path. The execution path can also be regarded as the order of processing that is likely to be executed by the program. When symbol execution is used for all executable execution paths, a calculation amount becomes enormous, and this is not realistic as a failure analyzing method.

In the failure analysis support system, the value of the variable referred to in a conditional branch is acquired from an execution log, a branch to be executed is specified, and the execution path as a target of symbol execution is reduced. By using the execution log when the failure has occurred, it is possible to use symbol execution for the execution path in which the failure occurs, and to shorten the time required for the failure analysis.

<<Configuration of Failure Analysis Support System>>

Figure 1:
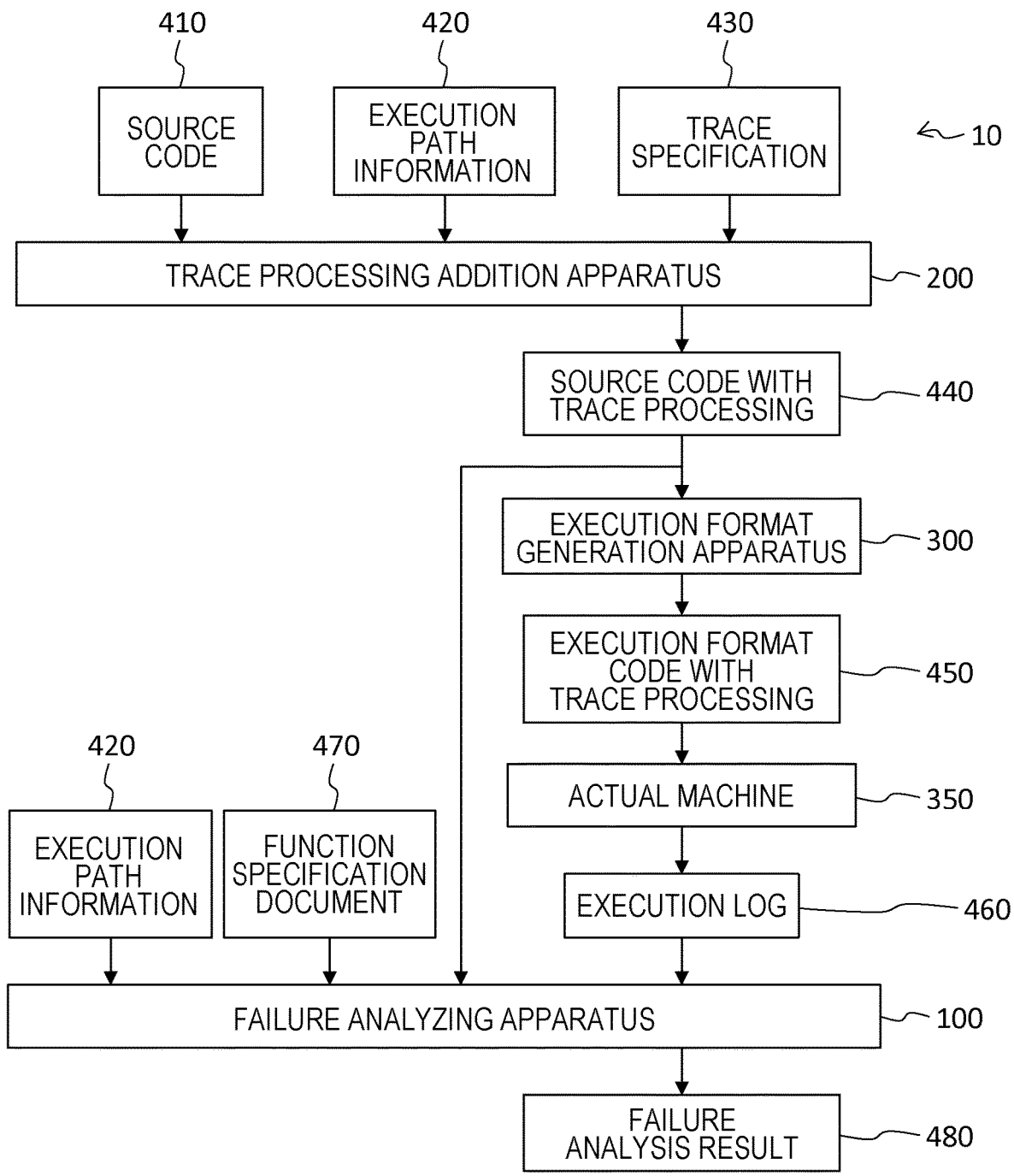
FIG. 1 is an overall configuration diagram of a failure analysis support system according to the present embodiment.

FIG. 1 is an overall configuration diagram of a failure analysis support system 10 according to the present embodiment. A configuration of the failure analysis support system 10 and a flow of failure analysis will be described with reference to FIG. 1.

The failure analysis support system 10 includes a trace processing addition apparatus 200 and a failure analyzing apparatus 100 (program analyzing apparatus). The trace processing addition apparatus 200 uses source codes 410, execution path information 420, and a trace specification 430 as inputs, and outputs source codes 440 with trace processing. The trace processing addition apparatus 200 embeds, in the source codes 410, trace processing (Trace statement) for outputting a value of a variable at the time of execution to an execution log 460. Details of the trace processing addition apparatus 200 will be described later.

An execution format generation apparatus 300 compiles the source codes 440 with trace processing, links the source codes 440 with trace processing with a necessary library program, and outputs execution format codes 450 with trace processing (execution format program). The execution format codes 450 with trace processing are installed (incorporated) on an actual machine 350 (for example, in-vehicle device) in which codes in an execution format are actually executed and an abnormality occurs.

When there is no particular risk of confusion, the source codes 440 with trace processing and the execution format codes 450 with trace processing are also simply referred to as programs. A program in the phrase "execute the program" is the execution format codes 450 with trace processing, and a program in the phrase "step included in the program" is the source codes 440 with trace processing.

The actual machine 350 operates by the actual machine 350 executing the installed program (the execution format codes 450 with trace processing), and thus the execution log 460 is generated. The value of the variable at the time of execution is recorded in the execution log 460 by the trace processing. In addition, the called function or abnormality (the contents of the abnormality, the generated function, or the like) may be recorded.

The failure analyzing apparatus 100 uses the source codes 440 with trace processing, the execution path information 420, a function specification 470, and the execution log 460 as inputs, and outputs a failure analysis result 480. The failure analyzing apparatus 100 refers to the execution log 460 and excludes an execution path which is not executed, from all execution paths of the program (the source codes 440 with trace processing). The failure analyzing apparatus 100 specifies a failure occurrence location by executing symbol execution processing on the remaining execution path, and outputs a failure occurrence condition as the failure analysis result 480. Details of the failure analyzing apparatus 100 will be described later.

<<Outline of Trace Processing Addition Apparatus>>

The trace processing addition apparatus 200 uses source codes 410, execution path information 420, and a trace specification 430 as inputs, and outputs source codes 440 with trace processing. The trace processing is processing of recording the value of the variable of the program in the execution log 460. The source codes 410 are source codes to be analyzed and is to be embedded in the trace processing.

Figures 2, 3, 4:
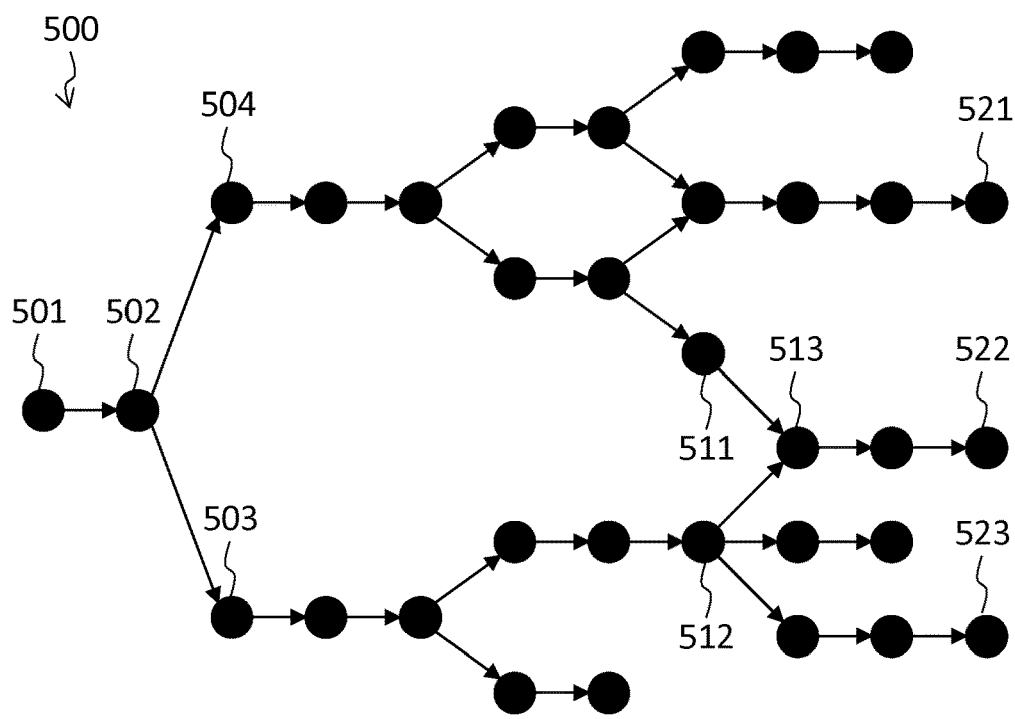
FIG. 2 is a source code before trace processing is inserted, according to the present embodiment.
FIG. 3 is a source code after the trace processing is inserted, according to the present embodiment.
FIG. 4 is a directed graph for explaining an execution path according to the present embodiment.

FIG. 2 is source codes 412 before trace processing is inserted, according to the present embodiment. The source codes 412 are some of the source codes 410. FIG. 3 is source codes 442 after the trace processing is inserted, according to the present embodiment. The source codes 442 are some of the source codes 440 with trace processing.

A result obtained by inserting (embedding) the step of the trace processing (Trace statement) before the conditional branch statement (if statement) in the second line included in the source codes 412 is the source codes 442. When the function foo is called and the second line of the source codes 442 is executed (processed), values of a variable x and a variable y as arguments of the trace processing at the time of execution are recorded in the execution log 460 (see FIG. 1).

The execution path information 420 is information of all execution paths that are included in the source codes 410 and are executable.

FIG. 4 is a directed graph 500 for explaining an execution path according to the present embodiment. A node of the directed graph 500 indicates a step (statement, sentence, line) of the source codes, and an edge indicates an execution order of the steps. The directed graph 500 indicates that the program starts from the step indicated by a node 501 and the execution path is divided into two pieces by the step of the conditional branch (conditional branch statement) indicated by a node 502. The path of each directed graph 500 from the node 501 as the start point to the node (for example, node 521, 522, or 523) as the end point is the execution path. The directed graph 500 indicates all execution paths. A partial path of the execution path is also referred to as the execution path.

In the above description, the node of the directed graph 500 is regarded as a step of the source codes, but may be regarded as a function included in the source codes. In this case, the edge is regarded as a function calling relationship, the execution path becomes a sequence of called functions, and the directed graph 500 can be regarded as indicating the function calling relationship.

It is assumed that the execution path information 420 includes both an execution path for a step (also referred to as a step execution path) and an execution path for a function (also referred to as a function execution path).

Returning to FIG. 1, the trace specification 430 is a specification related to the insertion processing of the trace processing, and includes information related to the upper limit of the insertable trace processing (Trace statement), for example. The upper limit depends on the storage capacity of the actual machine 350 in which the execution log 460 is stored, the number of Trace statements to be inserted, the number of variables as the target of the trace processing, the type (size) of the variable, and the like. For simple description, in the present embodiment, it is assumed that the upper limit is determined by the number of inserted Trace statements, and the trace specification 430 includes the upper limit of the Trace statement.

<<Configuration of Trace Processing Addition Apparatus>>

Figure 5:
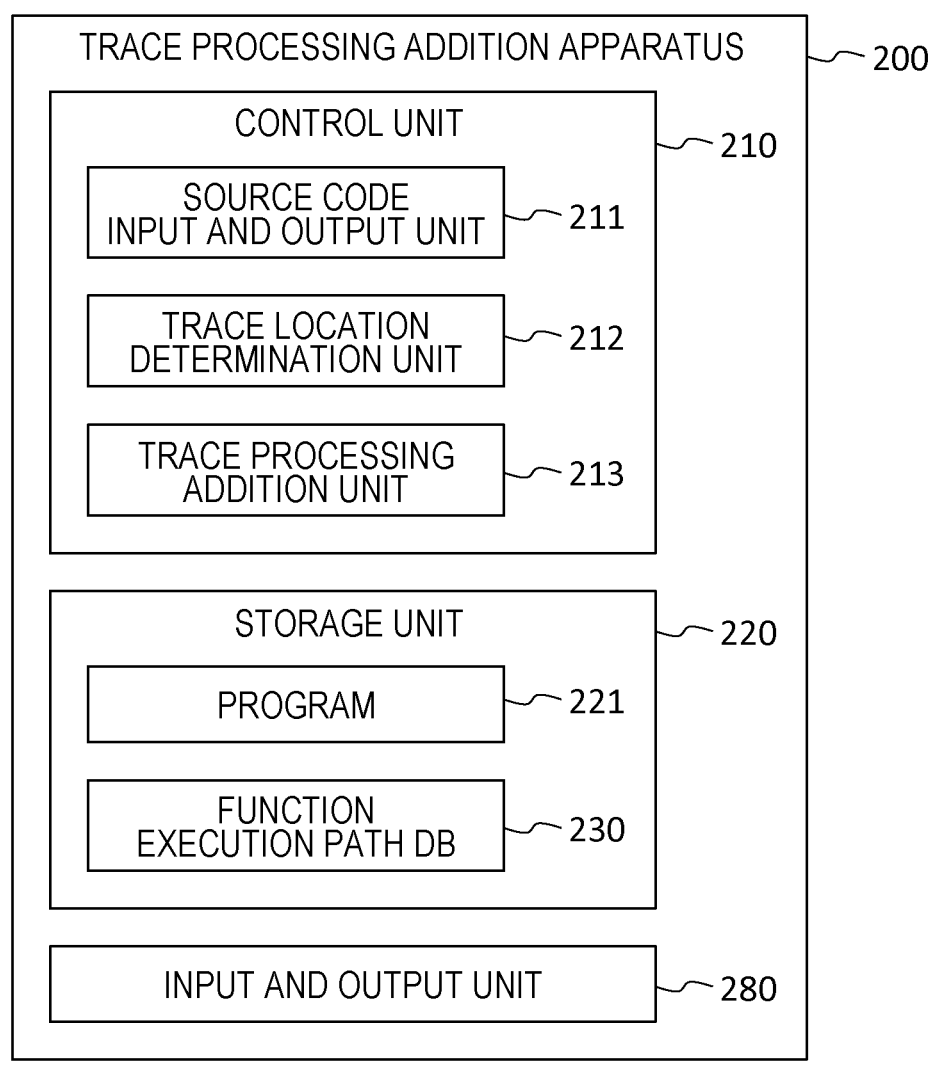
FIG. 5 is a functional block diagram of a trace processing addition apparatus according to the present embodiment.

FIG. 5 is a functional block diagram of the trace processing addition apparatus 200 according to the present embodiment. The trace processing addition apparatus 200 is a computer, and includes a control unit 210, a storage unit 220, and an input and output unit 280. A user interface device such as a display, a keyboard, and a mouse is connected to the input and output unit 280. In addition, the input and output unit 280 has an interface function with a recording medium and a communication function with another device.

The storage unit 220 is configured by a read only memory (ROM), a random access memory (RAM), a solid state drive (SSD), and the like. The storage unit 220 stores a program 221 and a function execution path database 230 (described as a function execution path DB (database) in FIG. 5). The program 221 includes a description of trace insertion processing (see FIG. 6 described later). The execution path information of the source codes 410 is stored in the function execution path database 230.

The control unit 210 is configured to include a central processing unit (CPU), and includes a source code input and output unit 211, a trace location determination unit 212, and a trace processing addition unit 213. The source code input and output unit 211 acquires the source codes 410 (see FIG. 1), the execution path information 420, and the trace specification 430 via the input and output unit 280 to store the source codes in the storage unit 220 or to output the source codes 440 with trace processing. The source code input and output unit 211 stores the function execution path included in the execution path information 420 in the function execution path database 230.

The trace location determination unit 212 determines an insertion location of the Trace statement in the source codes 410. In detail, the trace location determination unit 212 sets a candidate function for inserting the Trace statement in order from a function corresponding to a node through which many execution paths from the node 501 as the start point to a node as the end point in the directed graph 500 (see FIG. 4) regarded as the function execution path (function calling relationship) pass. In other words, the trace location determination unit 212 sets a node (function) through which more execution paths pass to have a higher insertion order of the Trace statement, with reference to the function execution path database 230.

For example, since all the execution paths pass through the nodes 501 and 502 (see FIG. 4), the nodes 501 and 502 have the highest insertion order of the Trace statement. In addition, since there is a node 511 on an upstream side of the node 513, and an execution path passing through the node 511 passes through the node 513, the node 513 has a higher insertion order than the node 511. When the directed graph 500 is regarded as the function calling relationship, the functions corresponding to the nodes 501 and 502 have the highest Trace statement insertion order. In addition, the function corresponding to the node 513 has a higher insertion order than the function corresponding to the node 511.

The trace processing addition unit 213 inserts, before the conditional branch statement (if statement) of the source codes, a Trace statement for outputting a value of a variable referred to for determination of the conditional branch to the execution log 460.

<<Trace Processing Addition Processing>>

Figure 6:
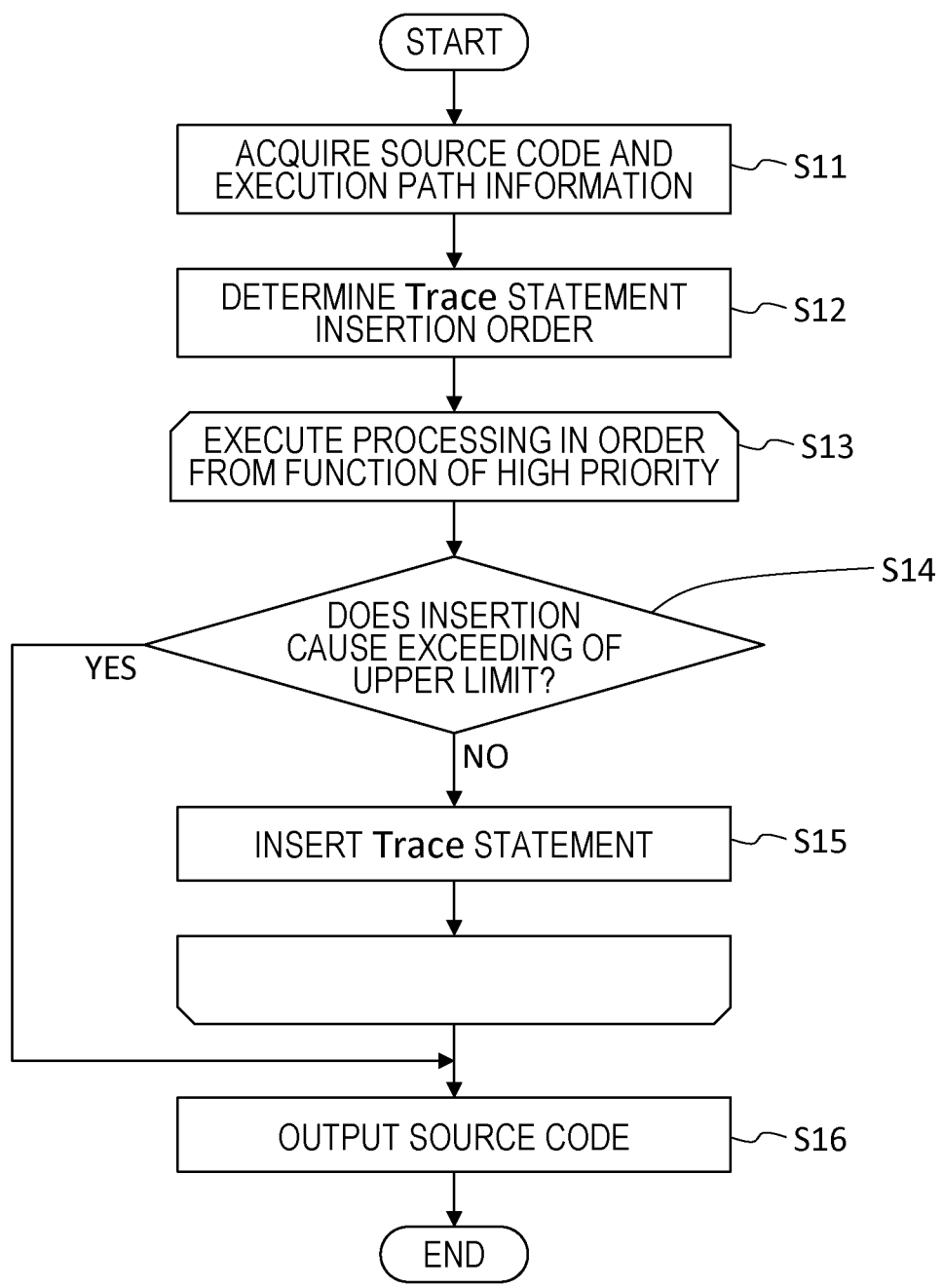
FIG. 6 is a flowchart of trace processing addition processing according to the present embodiment.

FIG. 6 is a flowchart of trace processing addition processing according to the present embodiment.

In Step S11, the source code input and output unit 211 acquires and stores the source codes 410 (see FIG. 1), the execution path information 420, and the trace specification 430 in the storage unit 220.

In Step S12, the trace location determination unit 212 determines the order of the functions into which the Trace statement is inserted. The trace location determination unit 212 sets a node (function) through which more execution paths (see the directed graph 500 regarded as a function calling relationship illustrated in FIG. 4) pass to have a higher insertion priority of the Trace statement.

In Step S13, the trace location determination unit 212 starts processing of repeating Steps S14 and S15 in descending order of the insertion order determined in Step S12.

In Step S14, the trace location determination unit 212 determines whether or not a Trace statement exceeds the upper limit when the Trace statement is inserted into the function. When the Trace statement exceeds the upper limit (Step S14→YES), the trace location determination unit 212 ends the repetitive processing, and proceeds to Step S16. When the Trace statement does not exceed the upper limit (Step S14→NO), the trace location determination unit 212 proceeds to Step S15. Note that the upper limit is the upper limit number into which the Trace statement included in the trace specification 430 can be inserted.

In Step S15, the trace processing addition unit 213 inserts a Trace statement before the conditional branch statement of the function (See FIGS. 2 and 3).

In Step S16, the source code input and output unit 211 outputs the source codes (the source codes 440 with trace processing illustrated in FIG. 1) into which the Trace statement is inserted.

<<Configuration of Failure Analyzing Apparatus>>

The failure analyzing apparatus 100 uses the source codes 440 with trace processing, the execution path information 420, the function specification 470, and the execution log 460 as inputs, and outputs the failure analysis result 480 (see FIG. 1). The function specification 470 is a specification of a function included in the source codes 410, and includes types and ranges of arguments and return values (see a function specification 479 described later illustrated in FIG. 8).

Figure 7:
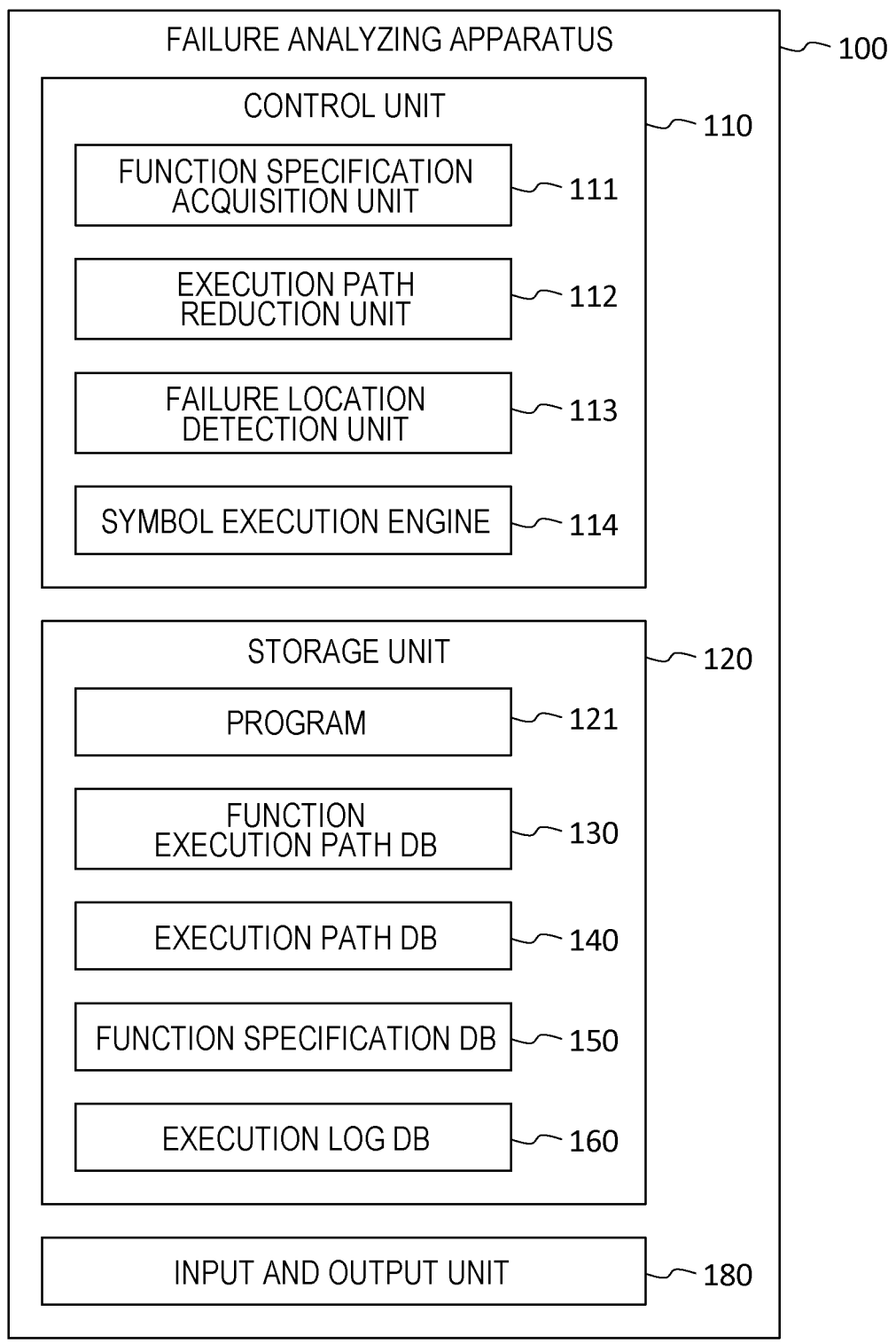
FIG. 7 is a functional block diagram of a failure analyzing apparatus according to the present embodiment.

FIG. 7 is a functional block diagram of the failure analyzing apparatus 100 according to the present embodiment. The failure analyzing apparatus 100 is a computer, and includes a control unit 110, a storage unit 120, and an input and output unit 180. A user interface device such as a display, a keyboard, and a mouse is connected to the input and output unit 180. In addition, the input and output unit 180 has an interface function with a recording medium and a communication function with another device.

The storage unit 120 includes a ROM, a RAM, an SSD, and the like. The storage unit 120 stores a program 121, a function execution path database 130, an execution path database 140, a function specification database 150, and an execution log database 160. In FIG. 7, the function execution path database 130 is referred to as a function execution path DB, the execution path database 140 is referred to as an execution path DB, the function specification database 150 is referred to as a function specification DB, and the execution log database 160 is referred to as an execution log DB. The program 121 includes a description of failure analysis processing (see FIG. 9 described later).

The control unit 110 is configured to include a CPU, and includes a function specification acquisition unit 111, an execution path reduction unit 112, a failure location detection unit 113, and a symbol execution engine 114. The function specification acquisition unit 111 acquires the source codes 440 with trace processing, the execution path information 420, the function specification 470, and the execution log 460 via the input and output unit 180. The function specification acquisition unit 111 stores the step execution path included in the execution path information 420 in the execution path database 140, stores the function execution path included in the execution path information 420 in the function execution path database 130, stores the function specification 470 in the function specification database 150, and stores the execution log 460 in the execution log database 160. At a time point when the execution path information of the step included in the execution path information 420 is stored, all the possible step execution paths (all the execution paths) are included in the execution path database 140.

The execution path reduction unit 112 reduces the step execution path. In the source codes 442 of the function foo illustrated in FIG. 3, the execution paths in the function foo include an execution path that proceeds to the second line, the third line, and the fourth line, and an execution path that proceeds to the second line, the third line, and the sixth line. By referring to the values (also referred to as trace results) of the variable x and the variable y which are the output results of the Trace statement in the second line included in the execution log database 160, the execution path reduction unit 112 can determine which execution path has passed. In detail, the execution path reduction unit 112 can specify which execution path the actual machine 350 has passed through (executed) when the program is executed in the actual machine 350 (see FIG. 1). The execution path reduction unit 112 specifies an execution path through which the actual machine does not pass (not performed, not reached) among execution paths obtained by division into a plurality of conditional branches, and deletes the specified execution path from the execution path database 140. In this manner, the execution path reduction unit 112 reduces the execution path that has not been executed from all the possible execution paths (all the execution paths).

The failure location detection unit 113 detects a function in which a failure has occurred from the functions included in the execution path remaining in the execution path database 140 by using the symbol execution engine 114. In detail, the failure location detection unit 113 executes the symbol execution passing through the remaining execution path, and calculates the condition (the values of the argument and the return value) under which the failure occurs.

FIG. 8 is a diagram for explaining the failure analysis processing according to the present embodiment. The failure location detection unit 113 calculates, as a failure occurrence condition, an argument and a return value that satisfy a logical product of a logical expression indicating the range of an argument of a function shown in the function specification 470 (see FIG. 1) and a logical expression indicating the outside of the range of the return value. The symbol execution technique is used for the calculation. The function bar will be described below as an example.

The specification of the function bar is as shown in the function specification 479. A logical expression (1) indicating the range of the argument and a logical expression (2) indicating the outside of the range of the return value are as follows. The logical expression (2) is also a negativeness of the logical expression indicating the range of the return value. Note that "&" is a logical product (AND) and "|" is a logical sum (OR).

$$0<=a\&a<=5\&0<=b\&b<=5 \tag{1}$$

$$c<1|10<=c \tag{2}$$

There are two (step) execution paths starting from the function bar. The first execution path is the second line and the third line of the source codes 411, the second line, the third line, and the fourth line of the source codes 442, and the third line and the fourth line of the source codes 411. The second execution path is the second line and the third line of the source codes 411, the second line, the third line, and the sixth line of the source codes 442, and the third line and the fourth line of the source codes 411. The two execution paths are branched in accordance with the condition (x<y) shown in the if statement in the third line of the source codes 442. Here, the third line of the source codes 411 is included in the execution path twice before and after the call of the function foo.

Since the first argument x of the function foo is (a+b) and the second argument y is (a−b), a logical expression (3) is established in the case of the first execution path, and a logical expression (4) is established in the case of the second execution path.

$$a+b<a-b\&c=a-b \tag{3}$$

$$a+b>=a-b\&c=a+b \tag{4}$$

When it is unclear which branch the source codes 442 proceed to in the conditional branch (if statement) of the third line, the failure location detection unit 113 needs to calculate the failure occurrence condition from a logical expression of ((1) & (2) & (3)) | ((1) & (2) & (4)). However, when it is known which execution path to proceed to by the conditional branch, ((1) & (2) & (3)) or ((1) & (2) & (4)) may be solved in accordance with the execution path as a branch destination, and thus it is possible to make the calculation of the failure occurrence condition be more efficient.

For example, the trace result 169 indicates that both the variable x and the variable y are 5 during program execution. Since the first execution path is deleted and the second execution path remains, the failure occurrence condition may be calculated from (1) & (2) & (4).

The failure location detection unit 113 performs symbol execution for the remaining execution paths obtained by reduction of the execution path reduction unit 112, and obtains the function in which a failure occurs and the failure occurrence condition. The function as the target of symbol execution may start from the function as the end point of the function execution path and be directed upstream of the execution path, or may be directed in the opposite direction.

<<Failure Analysis Processing>>

Figure 9:
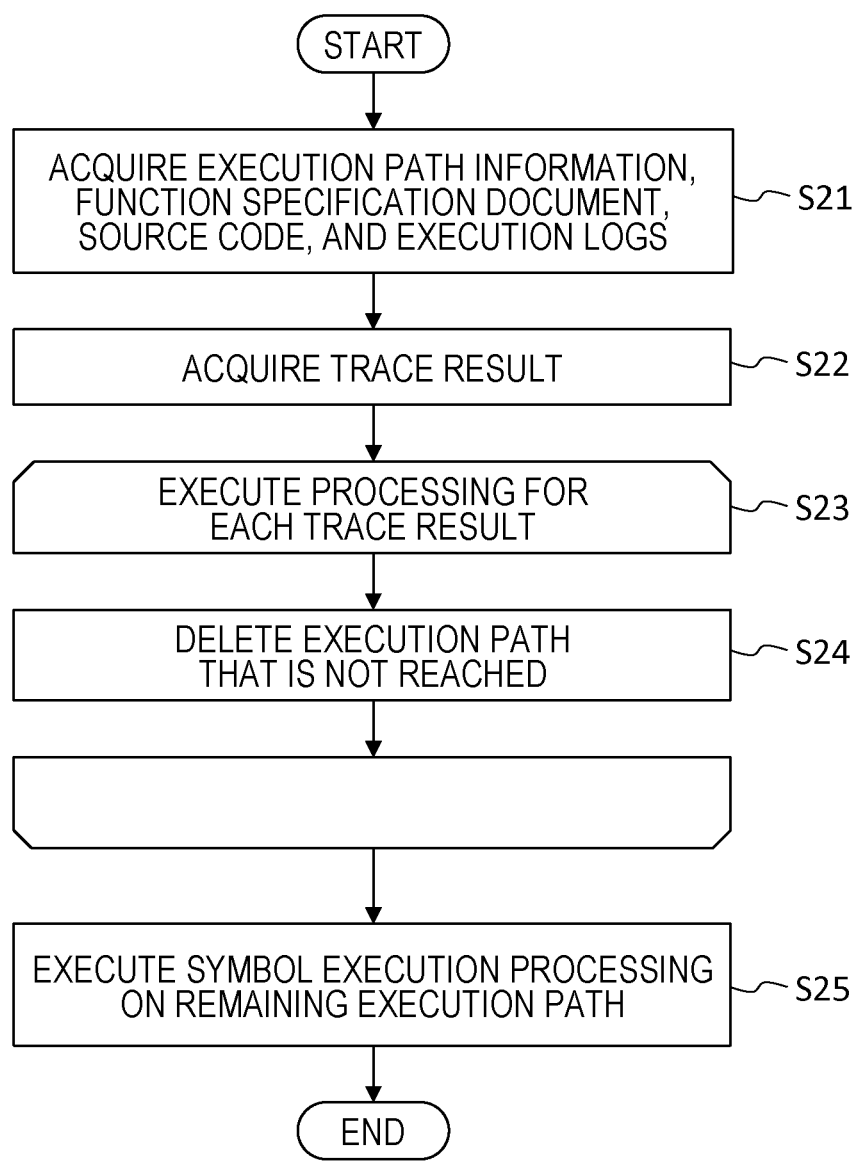
FIG. 9 is a flowchart of the failure analysis processing according to the present embodiment.

FIG. 9 is a flowchart of the failure analysis processing according to the present embodiment.

In Step S21, the function specification acquisition unit 111 acquires the execution path information 420 (see FIG. 1), the function specification 470, the source codes 440 with trace processing, and the execution log 460. The function specification acquisition unit 111 stores the acquired function specification 470 and the acquired execution log 460 in the function specification database 150 and the execution log database 160, respectively. In addition, the function specification acquisition unit 111 stores the function execution path and the step execution path included in the execution path information 420, in the function execution path database 130 and the execution path database 140, respectively.

In Step S22, the execution path reduction unit 112 acquires a trace result included in the execution log database 160.

In Step S23, the execution path reduction unit 112 starts processing of repeating Step S24 for each trace result acquired in Step S22.

In Step S24, the execution path reduction unit 112 refers to a variable result included in the trace result to specify a step execution path through which the machine does not pass (not performed, not reached) among the execution paths obtained by division into a plurality of pieces in the conditional branch, and to delete the step execution path from the execution path database 140.

In Step S25, the failure location detection unit 113 performs symbol execution for the remaining execution paths obtained by reduction of the execution path reduction unit 112, and calculates the function in which a failure occurs and the failure occurrence condition. The calculated failure occurrence condition is output as a failure analysis result 480.

Figures 10, 11:
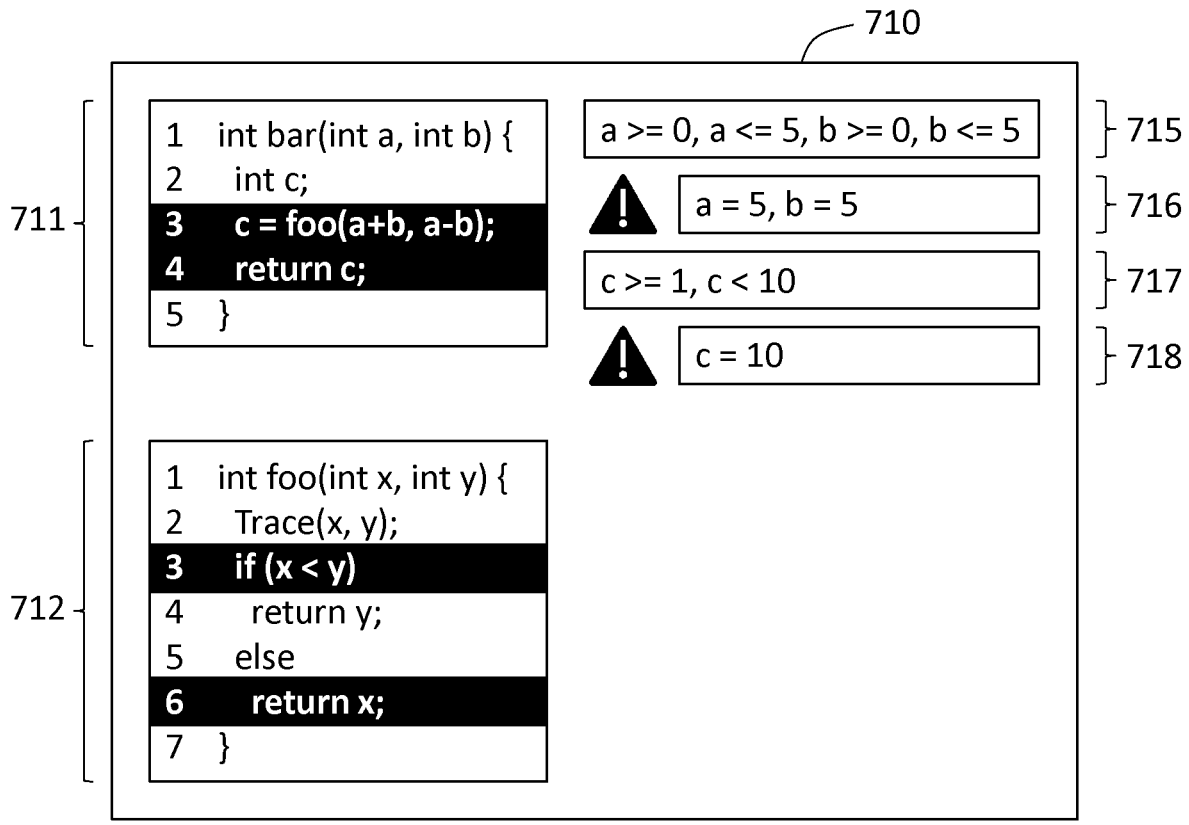
FIG. 10 is a screen configuration diagram of a failure analysis result screen according to the present embodiment.
FIG. 11 is a data configuration of a failure history database according to a modification example of the present embodiment.

FIG. 10 is a screen configuration diagram of a failure analysis result screen 710 according to the present embodiment. A source code display region 711 of the function bar and a source code display region 712 of the function foo are disposed on the left side of the failure analysis result screen 710. A specification display region 715 of the argument of the function bar, a specification display region 717 of the return value, a display region 716 of the failure occurrence condition, and a display region 718 of the failure occurrence content are disposed on the right side thereof. In the source code display regions 711 and 712, the execution path is highlighted. A warning mark is displayed in the vicinity of the left of the display region 716 of the failure occurrence condition and the display region 718 of the failure occurrence content to urge attention.

By referring to the failure analysis result screen 710, the developer can easily grasp the content of the failure (see the display region 718 of the failure occurrence content), the condition under which the failure occurs (see the display region 716 of the failure occurrence condition), and the progress of the failure occurrence (see the highlighted execution path). As a result, the developer can efficiently proceed with countermeasures against the failure.

<<Characteristics of Failure Analysis Support System>>

The trace processing addition apparatus 200 adds trace processing (Trace statement) to the source codes 410. The failure analyzing apparatus 100 refers to the trace result output by the trace processing to reduce the execution path included in the source codes 410, and executes symbol execution processing on the remaining execution path (remaining execution path) to calculate a failure occurrence condition.

The failure analyzing apparatus 100 can reduce the execution path by referring to the trace result. The number of execution paths doubles every time there is a conditional branch. Therefore, the number of execution paths is an order of the power of the number of conditional branches included in the function (including the function directly/indirectly called by the function), and increases exponentially in accordance with the number of conditional branches. The failure analyzing apparatus 100 refers to the trace result to specify which branch to proceed in the conditional branch and thus can greatly reduce the execution path. Subsequently, the failure analyzing apparatus 100 calculates the failure occurrence condition (failure condition) that is inconsistent with the specification with respect to the ranges of the argument and the return value for the function included in the remaining execution path.

The failure analyzing apparatus 100 can efficiently calculate the failure condition, and the developer can specify and correct the failure by referring to the failure condition.

Since there are many execution paths passing through the machine, and the number of calls is large, the trace processing addition apparatus 200 inserts the Trace statement in order from the function considered to have a high failure occurrence frequency. In this manner, it is possible to efficiently acquire variable information at the time of failure occurrence while suppressing the size of the execution log. In addition, it is possible to suppress the storage capacity of the actual machine 350 for the execution log, and to suppress the cost.

Modification Example: Addition of Trace Processing

In the embodiment described above, the trace location determination unit 212 in the trace processing addition apparatus 200 sets the node (function) through which more execution paths pass (see Step S12 illustrated in FIG. 6) to have the higher insertion priority of the Trace statement. The trace location determination unit 212 may increase the insertion order of the Trace statement for the function having more failure occurrences. In addition, the trace location determination unit 212 may increase the insertion order of the Trace sentence into the execution path on which the test has not been performed.

FIG. 11 is a data configuration of a failure history database 610 according to a modification example of the present embodiment. The failure history database 610 is stored in the storage unit 220 of the trace processing addition apparatus 200. The failure history database 610 is tabular data, and one row (record) indicates one failure occurrence. The record includes columns (attributes) of an identification number 611 (described as # in FIG. 11), a failure occurrence date and time 612, and an occurrence location 613. The identification number 611 is identification information of a failure occurrence. The failure occurrence date and time 612 is a date and time when the failure has occurred. The occurrence location 613 is a function having a failure.

According to the failure history database 610 illustrated in FIG. 11, three failures have occurred in the function A and two failures have occurred in the function B. Therefore, it is estimated that there is a high possibility that there is a failure that has not yet been found in the function A and the function B. Based on such estimation, the trace location determination unit 212 may increase the function in which the failure has occurred with respect to the insertion order of the Trace statement. The trace location determination unit 212 may increase the insertion order of the Trace statement for the function in which the number of failure occurrences increases. By determining the insertion order of the Trace statement in this manner, it is possible to reduce the execution path through the function that is likely to cause many failures.

Figure 12:
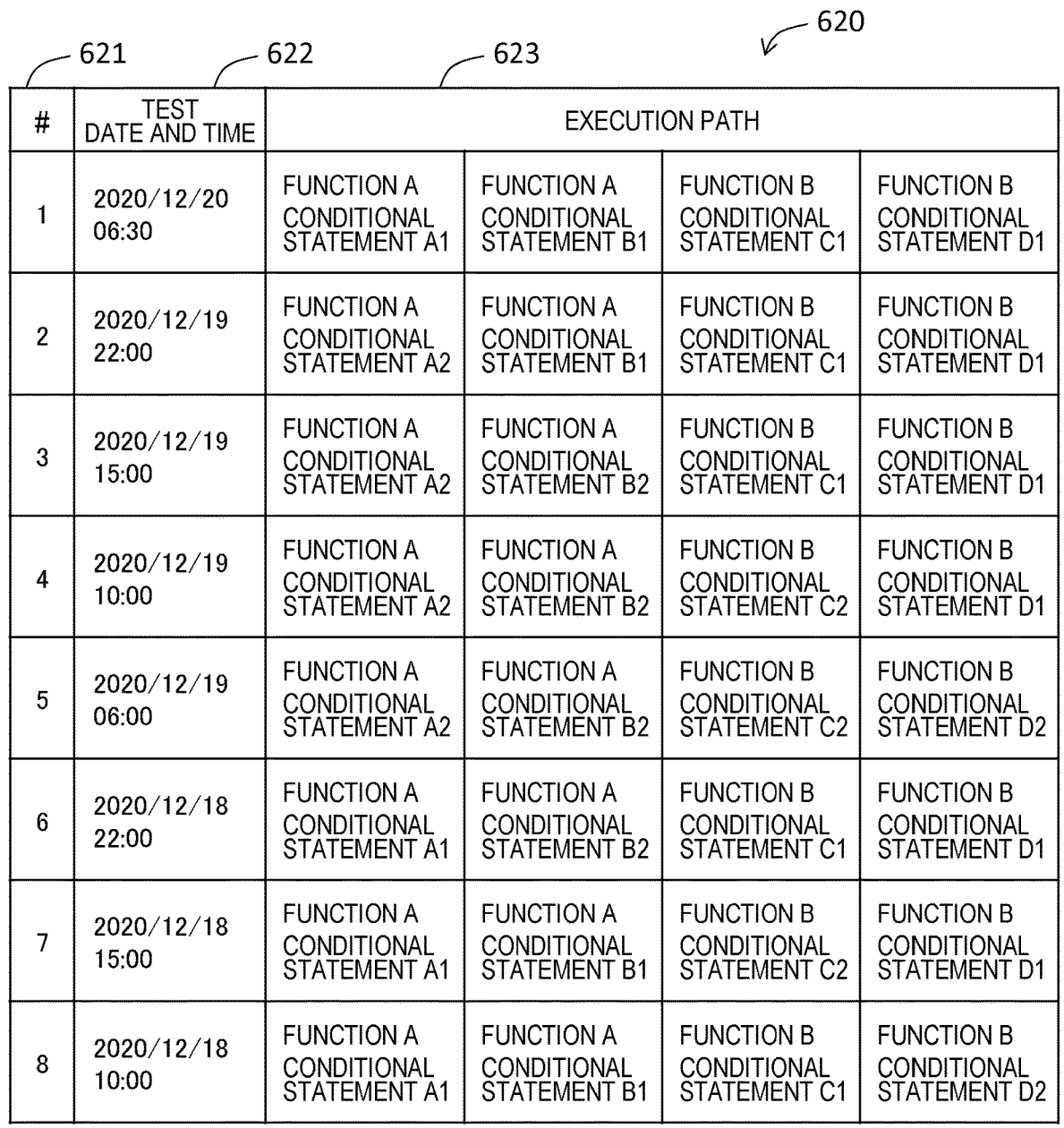
FIG. 12 is a data configuration of a test history database according to a modification example of the present embodiment.

FIG. 12 is a data configuration of a test history database 620 according to a modification example of the present embodiment. The test history database 620 is stored in the storage unit 220 of the trace processing addition apparatus 200. The test history database 620 is tabular data, and one row (record) indicates one test. The record includes columns (attributes) of an identification number 621 (described as # in FIG. 12), a test date and time 622, and an execution path 623. The identification number 621 is identification information of a test. The test date and time 622 is the date and time when the test has been performed. The execution path 623 is a tested execution path.

It is estimated that there is a low probability that a failure is included in the tested execution path, and there is a high probability that there is a failure that has not yet been found in the execution path that has not been tested. Based on such estimation, the trace location determination unit 212 may increase the insertion order of the Trace statement for the execution path that has not been tested. By determining the insertion order of the Trace statement in this manner, it is possible to reduce the execution path that shares a partial path with an execution path that is likely to cause many failures.

In the embodiment described above, the trace location determination unit 212 sets a candidate function for inserting the Trace statement in order from the function through which many function execution paths, which are function calling relationships of functions included in the execution path information 420, pass (see Step S12 in FIG. 6). The trace location determination unit 212 may refer to the step execution path to set the candidate for inserting the Trace statement (before the conditional statement) in order from the conditional branch statement through which many execution paths pass. It is possible to determine the insertion order of the Trace statement with finer granularity as compared with the case of a function unit, and a more useful trace result is recorded in the execution log, and the efficiency of failure analysis is improved.

Modification Example: Trace Processing

The trace processing (Trace statement) in the above embodiment outputs the value of the variable included in the conditional branch statement to the execution log. The failure analyzing apparatus 100 refers to this value to determine to which branch destination the branch has been made. In the trace processing, instead of outputting the value of the variable, information indicating to which branch destination the branch has been made may be output. For example, the value of the conditional expression of the conditional branch statement (the true/false value of the condition) may be recorded.

Modification Example: Failure Condition

In the above embodiment, as the failure condition (failure occurrence condition), the failure analyzing apparatus 100 calculates a condition (value of the argument) that satisfies the logical product of the logical expression indicating the range of the argument of the function and the logical expression indicating the outside of the range of the return value (see FIG. 8). The failure analyzing apparatus 100 may obtain another failure condition that is inconsistent (contradictory) with the function specification. For example, the failure analyzing apparatus 100 may calculate a condition that satisfies the logical product of the logical expression indicating the range of the argument of the function and the logical expression indicating the outside of the range of the argument of the function directly or indirectly called by the function in the execution path. For example, in FIG. 8, the failure analyzing apparatus 100 may calculate a condition that satisfies a logical product of a logical expression indicating a range of the argument ((a+b), (a−b)) of the function foo obtained from the specification of the argument of the function bar, and a negativeness of a logical expression indicated by the specification of the argument of the function foo.

In the embodiment described above, the function as a target for searching for the failure condition using symbol execution is a function included in the execution path. The failure condition may be searched for in order from the function (see FIG. 11) that is included in the execution path and has a large number of failures. In addition, the failure condition may be searched for in order from the function including the execution path that has not been tested (see FIG. 12). When the execution log 460 includes information of the function or the step in which an abnormality (error) has occurred, the failure analyzing apparatus 100 may search for the failure condition in order from the function or the function including the step. Alternatively, the failure condition may be searched for a function designated by a user (developer) of the failure analyzing apparatus 100. As described above, by obtaining the failure condition with priority, it is possible to calculate the failure condition with higher efficiency.

The target for searching for the failure condition is the function (method) included in the remaining execution path, but an operation such as addition, subtraction, multiplication, or increment may be regarded as the function and included. For example, the failure location detection unit 113 may search for the failure condition by using the specification of the variable (type of variable). For example, regarding the addition, the failure location detection unit 113 may search for the failure condition on the condition that the result of the addition is within the range of the specification of the variable and the overflow does not occur. In addition, the failure location detection unit 113 may search for the failure condition on the condition that the value of the variable or the expression as the index of the array corresponds to the length of the array.

Other Modification Examples

Although some embodiments of the present invention have been described above, the embodiments are merely examples and do not limit the technical scope of the present invention. For example, in the above-described embodiment, the execution path information 420 including all the execution path information is provided as the inputs of the trace processing addition apparatus 200 and the failure analyzing apparatus 100. The trace processing addition apparatus 200 and the failure analyzing apparatus 100 may analyze the source codes 410 or the source codes 440 with trace processing to extract an execution path, and may omit the execution path information 420.

The failure analysis support system 10 includes the failure analyzing apparatus 100 and the trace processing addition apparatus 200, but the two apparatuses may be integrated into one apparatus. In addition, some functional units may be integrated. For example, the trace location determination unit 212 and the trace processing addition unit 213 may be integrated into a trace processing adding unit, or the failure location detection unit 113 and the symbol execution engine 114 may be integrated into a failure location detection unit.

The present invention can take various other embodiments, and various changes such as omissions and substitutions can be made without departing from the gist of the present invention. The embodiments and their modifications are included in the scope and the gist of the invention described in the present specification and the like, and are also included in the invention described in the claims and the scope of equivalents thereof.

REFERENCE SIGNS LIST 10 failure analysis support system
100 failure analyzing apparatus (program analyzing apparatus)
111 function specification acquisition unit (execution path acquisition unit)
112 execution path reduction unit
113 failure location detection unit
114 symbol execution engine
200 trace processing addition apparatus
211 source code input and output unit
212 trace location determination unit (trace processing addition unit)
213 trace processing addition unit
410 source code
420 execution path information
430 trace specification
440 source code with trace processing
460 execution log
470 functional specification
480 failure analysis result (failure condition)
500 directed graph (execution path)

The invention claimed is:

1. A program analyzing apparatus comprising
an execution path reduction unit that deletes an execution path that is not executed by referring to information related to a branch destination of a conditional branch included in a program, from all execution paths that are all executable execution paths among execution paths that are columns of statements to be sequentially executed in the program;
a function specification acquisition unit that acquires specifications of ranges of an argument and a return value of a function included in the program; and
a failure location detection unit that calculates a failure condition that is a value of the argument inconsistent with the specification among functions included in a remaining execution path after deletion by the execution path reduction unit.

2. The program analyzing apparatus according to claim 1, wherein the information related to the branch destination of the conditional branch is either a value of a variable referred to in the conditional branch included in an execution log generated when the program is executed or a value of a conditional expression included in the conditional branch.

3. The program analyzing apparatus according to claim 1, wherein the failure condition is either
a failure condition that is values of the argument and the return value that satisfy a logical product of a logical expression indicating the range of the argument and a logical expression that is a negativeness of a logical expression indicating the range of the return value among the functions included in the remaining execution path, or
a failure condition that is a value of an argument of a function that satisfies a logical product of the logical expression indicating the range of the argument and a logical expression that is a negativeness of a logical expression indicating a range of an argument of a called function directly or indirectly called by the function in the remaining execution path, among the functions included in the remaining execution path.

4. The program analyzing apparatus according to claim 1, wherein the failure location detection unit specifies the remaining execution path including a statement in which an error has occurred during execution of the program, and calculates the failure condition.

5. The program analyzing apparatus according to claim 1, wherein the failure location detection unit calculates the failure condition with a priority given to a function in which a failure has occurred in the past, as a function for calculating the failure condition.

6. The program analyzing apparatus according to claim 1, wherein the failure location detection unit calculates the failure condition with a priority given to a function including an execution path on which a test has not been performed, as a function for calculating the failure condition.

7. A program analyzing method of a program analyzing apparatus, wherein the program analyzing apparatus executes:
a step of deleting an execution path that is not executed by referring to information related to a branch destination of a conditional branch included in a program, from all executable execution paths among execution paths that are columns of statements to be sequentially executed in the program;
a step of acquiring specifications of ranges of an argument and a return value of a function included in the program; and
a step of calculating a failure condition that is a value of the argument inconsistent with the specification among functions included in a remaining execution path after deleting the execution path that is not executed.

* * * * *